Figure 1:
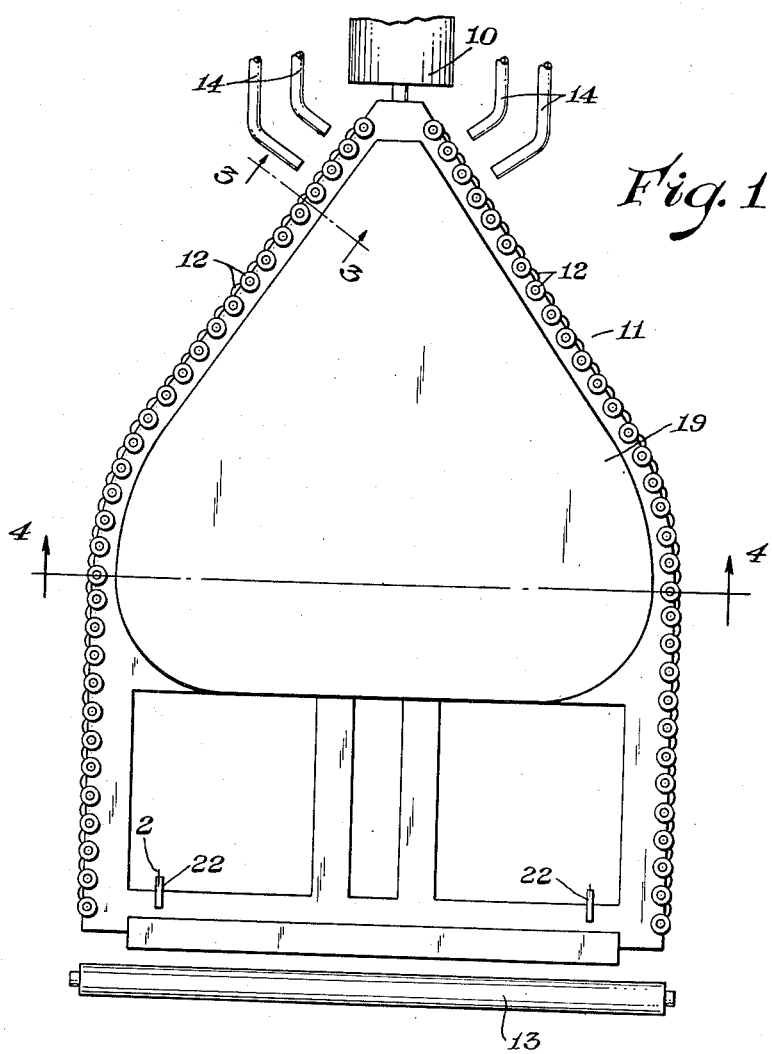

Dec. 21, 1954

M. O. LONGSTRETH ET AL 2,697,248

FILM STRETCHING DEVICE

Filed Dec. 22, 1952

2 Sheets-Sheet 1

INVENTORS.
Murrey O. Longstreth
Daniel W. Ryan
BY
Griswold & Burdick
ATTORNEYS

Dec. 21, 1954  M. O. LONGSTRETH ET AL  2,697,248
FILM STRETCHING DEVICE
Filed Dec. 22, 1952
2 Sheets-Sheet 2
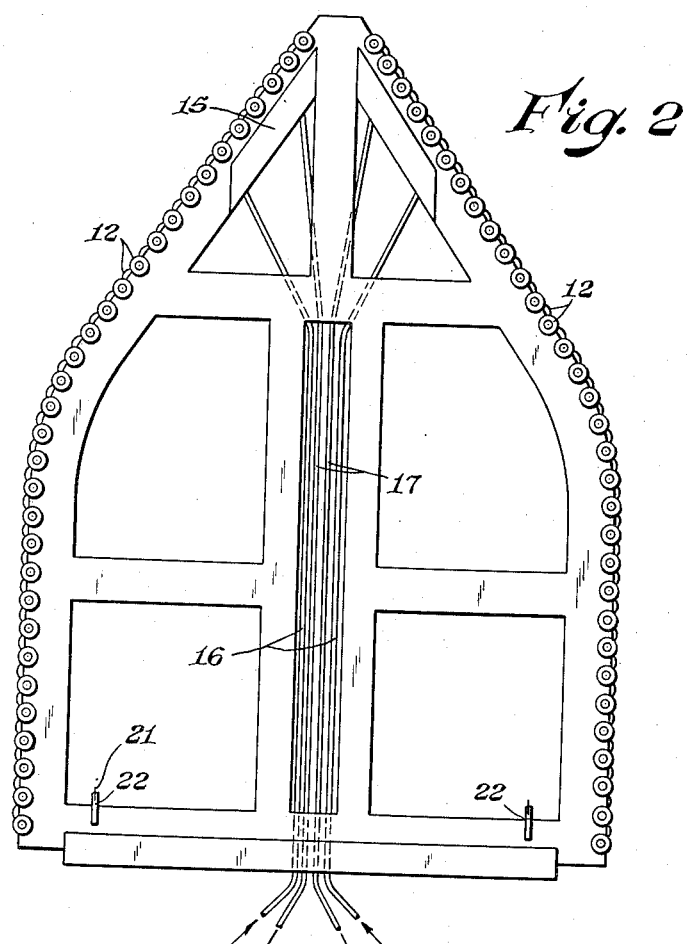
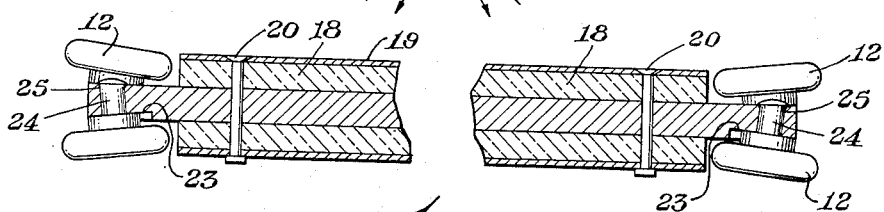
INVENTORS.
Murrey O. Longstreth
Daniel W. Ryan
BY
Griswold & Burdick
ATTORNEYS

United States Patent Office 2,697,248
Patented Dec. 21, 1954

2,697,248

FILM STRETCHING DEVICE

Murrey O. Longstreth and Daniel W. Ryan, Midland, Mich., assignors to The Dow Chemical Company, Midland, Mich., a corporation of Delaware Application December 22, 1952, Serial No. 327,363

4 Claims. (Cl. 18—1)

This invention relates to an improved device for the stretching or orienting of foils and film.

Films and foils made of certain thermoplastic polymers are highly useful. For example, as described in U. S. Patent 2,074,285, the films made from polystyrene are very valuable as an insulating tape for wrapping electrical cables. Unplasticized polystyrene in its usual state is very brittle, but it is known that when the molecules of polystyrene are arranged or oriented in a certain manner in thin films, the films are flexible and can be readily wound around cables and the like. To accomplish this orientation it is necessary to stretch the material biaxially during production of the film. Various devices have been made for attaining the desired orientation. One of these has been reported by H. Horn in Kunststoffe, 30, p. 53 (1940). In the method described by Horn, a polystyrene tube is expressed through a circular die and over a divergent spreader mandrel which is attached to the core of the die. The spreader mandrel has a plurality of parallel rollers along its periphery to aid in minimizing the friction between the mandrel and the sliding film. A pair of rolls is located beyond the mandrel and perpendicular to the direction of travel of the film. By operating these rolls at a peripheral speed greater than the speed of the plastic through the die, a simultaneous longitudinal stretch combined with the transverse stretch applied by the mandrel provides the proper biaxial orientation of the polystyrene molecules to attain the desired flexible film. However, when it is attempted to make wide sheets of thin film (1 mil or less), many difficulties are encountered which cause tears or breaks in the film, cause a non-uniform gauge in the film, or otherwise hinder production.

It is an object of this invention to provide an improved film stretching device for imparting a biaxial orientation of the molecules of the film.

It is a further object of this invention to provide a film stretching device with which wide sheets of film of uniform gauge may be produced.

It should be understood that the apparatus of the invention is not limited to the orientation of polystyrene, but that any material capable of being formed into a stretchable film may be employed.

The objects of this invention are accomplished by means of controlling the temperature of the spreader mandrel of the previously described machine. It is necessary that the edges of the mandrel be cool to prevent the sticking of the film thereto. However, for the most uniform stretching the large areas of film passing the front and rear faces of the mandrel should be kept uniformly warm. To achieve such temperature control, cooling jackets are installed near the small end of the spreader mandrel to cool the rollers and thus the small amount of film which touches those rollers, by conduction. To prevent the cooling jackets from cooling the major portion of stretching film, the mandrel is insulated.

The assembly and operation of the machine will be better understood by reference to the drawings and the following description which represent a preferred embodiment of the invention.

Figure 3:
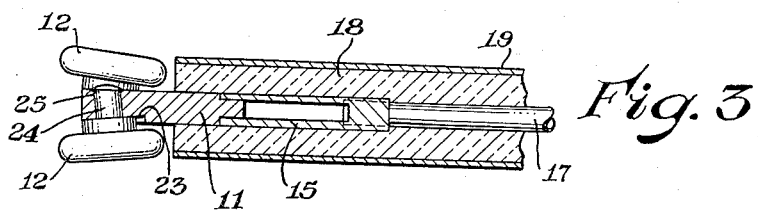

Fig. 1 represents a vertical view of the machine;
Fig. 2 represents a vertical view of the spreader mandrel with the insulating layers removed;
Fig. 3 represents a cross-section of the machine along line 3—3 of Figure 1; and
Fig. 4 represents a cross-section of the machine along line 4—4 of Figure 1.

The machine of which this invention is an improved modification consists of a means for expressing a thermoplastic material through a circular die 10, or other means of supplying an unoriented tubular film, and a divergent spreader mandrel 11 aligned with and attached to the core of the die 10. When so attached, spreader mandrel 11 will be completely within the tube of material. By divergent is meant straight or convex outer edges spreading out symmetrically from the end at which the film is fed onto the spreader mandrel. Concave edges do not give the desired results.

Disposed along the outer edges and on both sides of the mandrel 11 from a point near die 10 are freely rotating, rollers 12 which facilitate conveying the tube past the outer edges of the mandrel 11 without frictional drag. It is preferred that the rollers 12 on one face of the mandrel 11 be in staggered relationship to the rollers 12 on the other face of the mandrel 11.

It is also preferred to have the rollers 12 inclined at an angle to the plane of the mandrel 11 as described in our concurrently filed application, Serial No. 327,361. In that method the mounting of the rollers 12 consists of cutting niches 23 along the sides and near the outer edge of mandrel 11. Stub shafts 24 are inserted into holes 25 drilled perpendicularly into the face of the niche 23 nearest the outer edge of mandrel 11. Stub shafts 24 are rigidly held in place by upsetting one end. The rollers 12 are then mounted on stub shafts 24 so as to be freely rotating.

A pair of driven rolls 13 is located beyond the spreader mandrel 11 and extends the width of the mandrel 11. By operating the rolls 13 at a peripheral speed greater than the speed at which the polymer is being extruded, the rolls 13 provide a longitudinal stretch to the film at the same time as the radial stretch imparted by the mandrel 11.

The tube of stretched polymer may be slit into two or more flat sheets. Suitable means for slitting the tube are described in our concurrently filed application, Serial No. 327,362. In the preferred embodiment, sharp edged cutting devices 21, such as razor blades, are mounted in brackets 22 rigidly attached to the spreader mandrel.

The improved modification of the above-described machine which constitutes this invention consists of means for controlling the temperature across the spreader mandrel. It is necessary to cool that part of the film which contacts the rollers 12 to prevent it from sticking thereto. However, the remainder of the film must be kept hot for easier and more uniform stretching. To accomplish these ends, fluid cooled channels 15 are provided in the mandrel frame 11 near its forward, or small, end. This may be done conveniently by slotting, or grooving the frame 11 symmetrically, near its apex, and providing a fluid-tight cover for the so-hollowed portion, as well as fluid inlet 16 and outlet 17 conduits. Such conduits are conveniently disposed centrally of the mandrel 11, and receive and discharge fluid at points beyond that at which the tubular plastic film is slit and reeled.

Since it is desired to cool the film only at the edges of the mandrel, it is necessary to insulate the other parts of the mandrel. A suitable means of achieving this result is to apply a thin layer 18 of insulating material over the upper parts of both faces of the mandrel 11, leaving the rollers 12 exposed. Any insulating material may be used, but glass wool is preferred. The insulating material may be held in place by sheets 19 of stainless steel or other smooth material which does not tend to adhere to the hot plastic film. Such facing sheets may serve the added function of reflecting heat back to the film.

In operation, a thermoplastic material, such as polystyrene, is expressed through a die 10 so as to form a tube of hot stretchable material. The tube then moves downward and over the spreader mandrel 11 which causes the tube to be transversely stretched. At the point where the tube comes into contact with the mandrel 11, an externally mounted air jet 14 directs a stream of air over that part of the tube which will contact the edges of the mandrel 11. This part of the film is cooled further by conduction from the cooling jackets 15. It is important that only the edges be cooled. Otherwise a non-uniform gauge film will result. The film moves over the edges of the mandrel 11 on freely-rotating rollers 12 which minimize the friction of the film sliding over the edges. The film is stretched longitudinally by a pair of driven rolls 13 extending across the width of the mandrel 11. The tube is slit by razor blades 21 so that two flat sheets are obtained.

By using the temperature controlling means of this invention, wide sheets of film of uniform gauge may be produced. When the cooling jackets were employed without the insulation no sticking of the film to the rollers was noticed even without the external air jets 14. However, the film had a 30 per cent variation in gauge across the trimmed film. When the cooling jackets were used with the insulation less than a 10 per cent variation in gauge across the trimmed film was attained. When there is less than a 10 per cent variation in gauge of the film, the film is a highly useful wrapping material.

We claim:

1. In an apparatus for stretching previously unoriented tubular film both laterally and longitudinally comprising a spreader mandrel having two parallel plane faces lying between outer edges which diverge symmetrically from the end at which film is fed to said mandrel, of a length and disposed with said outer edges at an angle to provide the desired radial stretch to tubular film advanced thereover; freely rotating film-engaging rollers disposed along the outer edges of both sides of the mandrel; and a means for applying a longitudinal stretch to the film; the combination with said spreader mandrel of jacketed cooling chambers, for circulation of cooling fluid, installed in the mandrel frame near the small end thereof; a plurality of conduits, for conducting fluid to and from said chambers, disposed longitudinally of said mandrel and in communication with means, externally of the mandrel, for circulation of said fluid; and heat-insulating means across the front and rear faces of the mandrel between the rows of said film-engaging rollers.

2. The improved apparatus claimed in claim 1, wherein the heat-insulating means employed is glass wool.

3. In the improved apparatus claimed in claim 1, the further combination with said mandrel and heat-insulating means of facing sheets of smooth material which is not softened by and does not tend to adhere to the hot plastic film, to hold the insulating layers in position.

4. The improved apparatus claimed in claim 3, wherein the smooth facing sheets are of stainless steel.

References Cited in the file of this patent

UNITED STATES PATENTS

| Number | Name | Date |
|---|---|---|
| 2,361,369 | Grebe et al. | Oct. 31, 1944 |

FOREIGN PATENTS

| Number | Country | Date |
|---|---|---|
| 431,619 | Great Britain | July 11, 1935 |